(No Model.) 2 Sheets—Sheet 1.
J. L. SARDY.
SPRINKLING DEVICE.
No. 481,873. Patented Aug. 30, 1892.
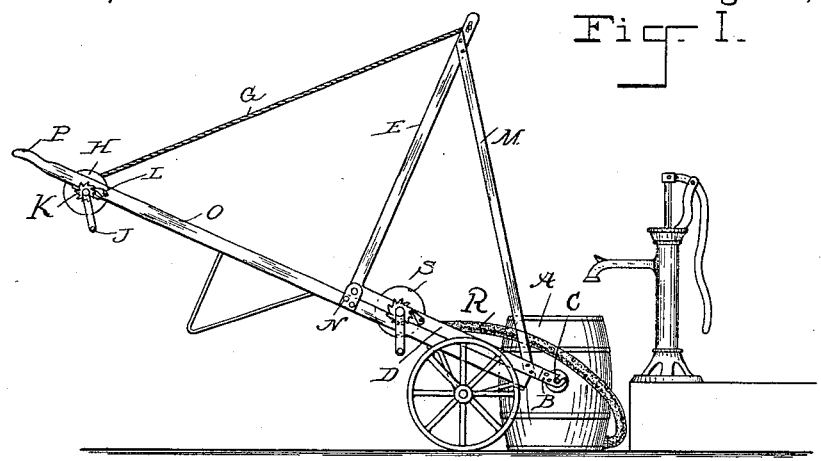
Fig. I.
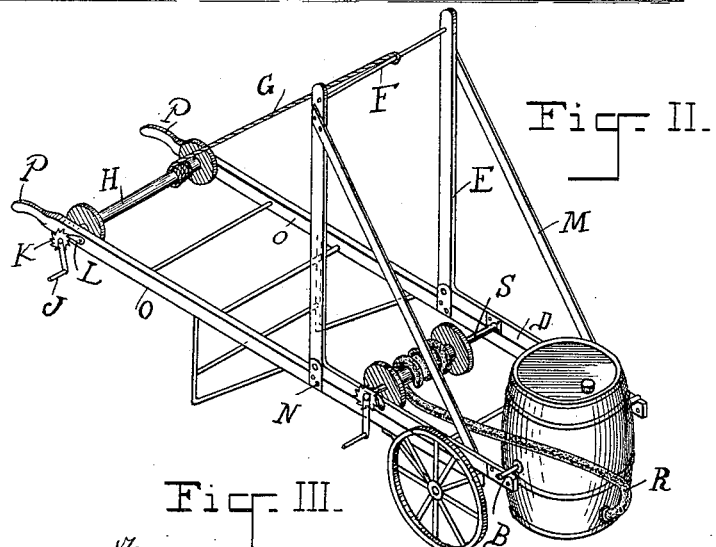
Fig. II.
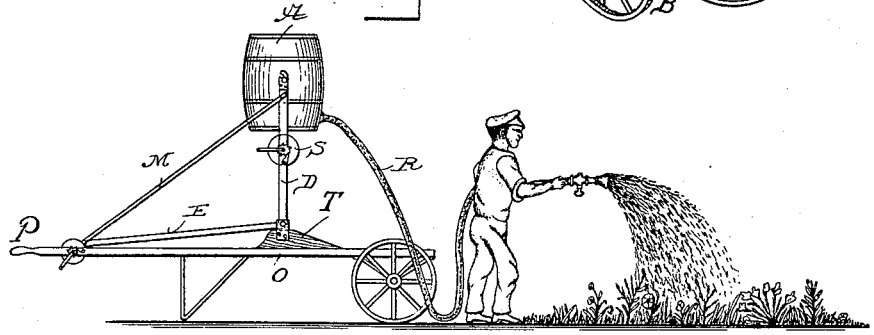
Fig. III.
Witnesses
Lillie Hanna
Chas. W. Thomas
Inventor
John L. Sardy
per Knight Bros.
att'ys (No Model.) 2 Sheets—Sheet 2.
J. L. SARDY.
SPRINKLING DEVICE.
No. 481,873. Patented Aug. 30, 1892.
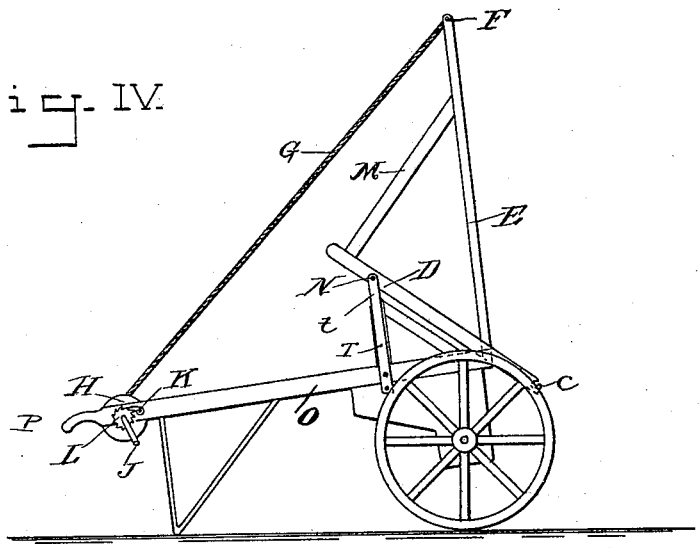
Fig. IV.
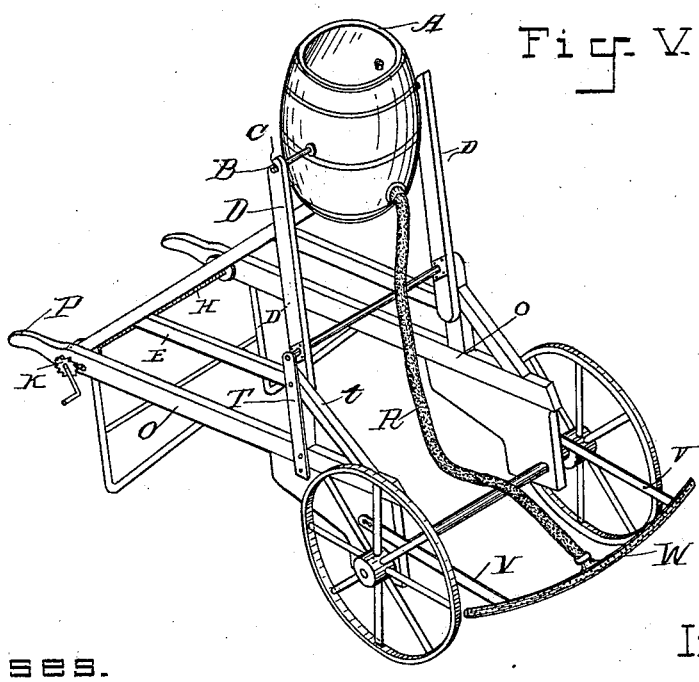
Fig. V.
Witnesses.
B. E. Bidgood
Chas. Momm.
Inventor
John L. Sardy
per
Knight Bros
attys

UNITED STATES PATENT OFFICE.

JOHN L. SARDY, OF PELHAM MANOR, NEW YORK, ASSIGNOR TO ETTA L. SARDY, OF SAME PLACE.

SPRINKLING DEVICE.

SPECIFICATION forming part of Letters Patent No. 481,873, dated August 30, 1892.

Application filed September 18, 1891. Serial No. 406,136. (No model.)

*To all whom it may concern:*

Be it known that I, JOHN L. SARDY, a citizen of the United States, residing at Pelham Manor, in the county of Westchester, State of New York, have invented a new and useful Sprinkling Device, of which the following is a specification.

My invention relates generally to a portable tank or barrel supported so as to be vertically adjustable and arranged upon a carriage or vehicle in such a manner that it can be shifted from place to place, as will be hereinafter described. It contemplates more especially the arranging and supporting of the tank or barrel in such a manner that it can be placed under a water-discharging hydrant or pump, or, if desired, dipped in a pond, and then by any suitable means easily raised to an elevated position for the purpose of giving a pressure to the flow through the water-discharging hose and nozzle.

Referring to the accompanying drawings, which form a part of this specification, Figure I represents my improved sprinkling apparatus in a position ready for the filling of the tank or barrel. Fig. II represents a perspective view of my improved sprinkler after the tank has been filled and it is ready to be raised to the elevated position. Fig. III represents the tank or barrel in an elevated position and the device in operation. Fig. IV is a modification in the construction of the barrel-lifting frame. Fig. V is a perspective view showing the barrel in an elevated position and operating in combination with a lawn-sprinkler attached to the vehicle-frame.

In the drawings, A represents a tank or barrel provided at the sides with journals or gudgeons B, which rest and turn in suitable supporting-journals C upon the ends of arms D. In connection with the arms D are the upright arms E, which in connection with the former constitute a large elbow or bellcrank lever or tank-carrying frame. The arms D E may be arranged at right angles to each other, as shown in Figs. I and II, or at a greater angle, as shown in Figs. III and IV.

Between the upper ends of the arms E, I provide a cross-bar F, and from a central point upon this cross-bar extend a rope or chain G, which is wound at its lower end upon a drum H. The drum H is provided at one end with a winch J, having a pawl-and-ratchet mechanism K L. The elbow-frame D E is provided with straightening bars or braces M, and the said frame is suitably pivoted at N to the main frame O or at an elevation from the frame, as hereinafter described, at the outer end of which I place handles P for the operator's use when it is desired to transport the sprinkler from place to place.

At R, I show a hose, of rubber or other suitable material, connected to and opening out from the lower portion of the tank or barrel.

At S, I show a reel upon which the hose may be wound when not in use. This reel is preferably supported in the frame D E; but it may be placed in any suitable locality, or the hose may be otherwise disposed of.

In Fig. III I have shown a slight modification where the right-angled joint of the frame D E is modified, a more obtuse angle being formed at this point, and a greater elevation being secured for the tank by means of the blocks T.

In Fig. IV I have shown a further modification in the construction and arrangement of the frame. The supporting-blocks T are lengthened and are provided with braces *t*. This change in the leverage is beneficial, as it provides a more easy manipulation and at the same time raises the tank or barrel to a greater height.

In Fig. V I show the application of my invention to a lawn-sprinkler. The hose R in this case empties into the discharging-pipe section W. Arms V, removably attached to the frame, serve to support the sprinkler W. By means of this arrangement the vehicle can be drawn or pushed over the lawn and operate as a sprinkling-cart.

The method of operation of my machine is as follows: When it is desired to employ the sprinkler, the tank or barrel A is moved to a position under a pump or other water-discharging apparatus and is tipped into the position shown in Fig. I. The tank is then filled, after which it may be transported to any desired locality, and then by means of the hand-winch K L and the drum H is lifted to an elevated position, as shown in Fig. III or V, the elbow-frame D E readily turning upon the pivotal point N and the pawl-and-ratchet mechanism K L serving to automatically lock the frame into position. When the tank or barrel is in the position shown in Fig. III or V, the height will be sufficient to cause considerable pressure in the hose and discharging nozzle or sprinkler, sufficient, in fact, to produce the desired spread through the discharging end. In this position, also, the barrel or tank has been swung beyond the dead-center of the pivoted frame D E. When it is desired to use the apparatus as a lawn-sprinkler, the discharging-nozzle $z$ (shown in Fig. III) is removed and the pipe-section W (shown in Fig. V) is substituted therefor, the supports Y serving to retain the sprinkler in place, either while the vehicle is stationary or when it is moved about.

It is understood that I do not limit myself to the exact details as shown, but may vary them from time to time as to size, proportion, and distribution, the essential features being, first, the supporting of a tank or other water-carrying vessel upon a vertically-adjustable frame in connection with a carriage or vehicle for transporting the same from place to place; second, the swiveling of the water-carrying vessel upon the frame in such a manner that it can be readily thrust beneath a water-discharging pipe or pump or dipped in a pond and then by placing the vehicle in its normal position raising the barrel from the ground; third, by means of a hand-winch or other suitable mechanism in raising the tank or barrel to an elevated position, thereby securing the desired pressure; fourth, in combining with the water cart or carrier a removable pipe-section adapted to be attached to the cart and to operate as a lawn-sprinkler, and, finally, the supporting of the tank or barrel in an elevated position and beyond the dead-center of the swinging frame D E.

It is by means of the adjustability of the barrel and its carrying-frame that I can hold it to any desired position relative to the center of gravity, and the operator therefore can utilize this fact, so that no weight of any kind will have to be supported by him when propelling the vehicle.

Having thus described my invention, the following is what I claim as new herein and desire to secure by Letters Patent:

1. In a water-sprinkling apparatus, the combination of the vehicle or carriage, the tilting frame pivoted thereto, the tank or water-barrel swiveled to said frame, and a hand-winch or other suitable mechanism for elevating the barrel, as and for the purpose set forth.

2. In a sprinkling apparatus, the combination of the vehicle or carriage, the tilting frame pivoted thereto, and the barrel or tank A, swiveled in the tilting frame, the parts being so arranged as that the barrel when in an elevated position can be retained at or just within the dead-center, as and for the purposes set forth.

3. In a sprinkling apparatus, the combination of a vehicle or carriage, the tilting frame D E, pivoted thereto, the barrel or tank A, swinging in the tilting frame, the said barrel being provided with a hose R and reel S, the rope or chain G, and winding-drum H, said drum being mounted on the main frame of the vehicle, substantially as and for the purposes set forth.

JOHN L. SARDY.

Witnesses:
HERBERT KNIGHT,
HARRY E. KNIGHT.